United States Patent
McGuire et al.

(10) Patent No.: US 10,309,564 B1
(45) Date of Patent: Jun. 4, 2019

(54) EXTENDABLE SPOOL

(71) Applicant: OIL STATES ENERGY SERVICES, L.L.C., Houston, TX (US)

(72) Inventors: Bob McGuire, Meridian, OK (US);
Danny L. Artherholt, Asher, OK (US);
Mickey Claxton, Oklahoma City, OK (US); Blake Mullins, Edmond, OK (US); Darin Grassmann, Piedmont, OK (US)

(73) Assignee: OIL STATES ENERGY SERVICES, L.L.C., Houston, TX (US)

( * ) Notice: Subject to any disclaimer, the term of this patent is extended or adjusted under 35 U.S.C. 154(b) by 0 days.

(21) Appl. No.: 16/184,510

(22) Filed: Nov. 8, 2018

(51) Int. Cl.
*F16L 27/08* (2006.01)
*B65H 75/24* (2006.01)

(52) U.S. Cl.
CPC ........ *F16L 27/0804* (2013.01); *B65H 75/241* (2013.01); *B65H 2701/332* (2013.01)

(58) Field of Classification Search
CPC ... F16L 27/08; F16L 27/0804; F16L 27/0808; F16L 27/0812; F16L 27/0816; F16L 27/12
USPC ............ 285/145.1, 145.4, 298, 302, 386, 32
See application file for complete search history.

(56) References Cited

U.S. PATENT DOCUMENTS

| | | | | |
|---|---|---|---|---|
| 969,358 A * | 9/1910 | Goodall | ................... | F16L 27/12 285/148.23 |
| 1,301,243 A * | 4/1919 | Ford | ....................... | F16L 27/12 285/148.1 |
| 1,334,007 A * | 3/1920 | White | ...................... | F16L 27/12 277/621 |
| 1,471,045 A * | 10/1923 | Maupin | .................... | F16L 15/08 285/148.19 |
| 2,143,568 A * | 1/1939 | Munro | .................... | F16L 19/06 285/32 |
| 2,359,846 A * | 10/1944 | Hayman | ................. | F16L 15/02 285/116 |
| 2,390,445 A * | 12/1945 | Mercier | .................... | F16J 10/02 220/304 |
| 2,533,097 A * | 12/1950 | Dale | ....................... | F16L 27/12 174/86 |
| 4,252,348 A * | 2/1981 | Kojima | ..................... | F16L 5/12 285/142.1 |
| 4,436,325 A * | 3/1984 | Miller | ..................... | F16L 27/12 285/18 |
| 6,106,024 A * | 8/2000 | Herman | ................ | E21B 17/085 285/18 |
| 6,471,249 B1 * | 10/2002 | Lewis | ..................... | F16L 27/12 285/22 |
| 8,777,274 B2 * | 7/2014 | Chou | ..................... | F16L 27/12 285/145.1 |

(Continued)

*Primary Examiner* — Aaron M Dunwoody
(74) *Attorney, Agent, or Firm* — Morgan, Lewis & Bockius LLP

(57) ABSTRACT

An extendable spool is disclosed. The length of the extendable spool is able to continuously varied. The extendable spool accounts for length variances in flow lines by extending the flow line rather than redirecting the flow. Because the flow direction does not make any turns, erosion is minimized on both the extendable spool and downstream parts. The extendable spool is readily scalable from small diameters to large diameters. Because of this, it requires fewer lines and therefore less setup time to account for length differences between large diameter lines.

10 Claims, 6 Drawing Sheets

(56) References Cited

U.S. PATENT DOCUMENTS

| | | |
|---|---|---|
| 8,839,867 B2 | 9/2014 | Conrad |
| 8,978,763 B2 | 3/2015 | Guidry |
| 8,991,873 B2 * | 3/2015 | Weinhold ................ F16L 27/12 |
| | | 285/101 |
| 9,068,450 B2 | 6/2015 | Guidry |
| 9,222,345 B2 | 12/2015 | Conrad |
| 9,255,469 B2 | 2/2016 | Conrad |
| 9,518,430 B2 | 12/2016 | Guidry |
| 9,631,469 B2 | 4/2017 | Guidry et al. |
| 9,903,190 B2 | 2/2018 | Conrad et al. |
| 9,915,132 B2 | 3/2018 | Conrad |
| 9,932,800 B2 | 4/2018 | Guidry |
| 10,094,195 B2 | 10/2018 | Guidry |
| 10,132,146 B2 | 11/2018 | Guidry |
| 2006/0197342 A1 * | 9/2006 | Yen ........................ F16L 15/02 |
| | | 285/298 |
| 2009/0261575 A1 * | 10/2009 | Bull ........................ E21B 17/02 |
| | | 285/32 |
| 2013/0175039 A1 * | 7/2013 | Guidry .................... E21B 33/03 |
| | | 166/308.1 |

\* cited by examiner

EXTENDABLE SPOOL

TECHNICAL FIELD

The present disclosure relates generally to oil or gas wellbore equipment, and, more particularly, to an extendable spool connector.

BACKGROUND

Accounting for length variances on non-permanent, pressurized, fluid-flow lines is normally accomplished by redirecting the flow through one or more turns until the desired length is achieved. Examples of the traditional length make-up methods are seen with hoses (via their flexible nature) and swiveling elbows (e.g., Chiksans). However, flow redirection through elbows or hoses accelerates erosion, especially when there are particulates in the fluid and/or when the fluid is flowing at a high rate, as seen during hydraulic fracturing operations. Erosion is accelerated not only on the parts redirecting the flow, but also on parts downstream.

Another drawback of using flow redirection for length make-up is that the method is not easily scalable to larger diameters—the required wall thicknesses quickly make installation difficult at best, to impractical at worst; therefore, traditional flow redirection lines used to make up for length variances are, relatively speaking, smaller diameters. One drawback of only being able to redirect flow with small diameter lines is that multiple redirected-flow lines must be used to account for length differences between large diameter lines. Therefore, what is needed is an apparatus, system, or method that addresses one or more of the foregoing issues, among one or more other issues.

SUMMARY OF THE INVENTION

The extendable spool accounts for length variances by extending the flow line rather than redirecting the flow. Because the flow direction does not make any turns, erosion is minimized on both the extendable spool and downstream parts. The extendable spool is readily scalable from small diameters to large diameters. Because of this, it requires fewer lines and therefore less setup time to account for length differences between large diameter lines.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
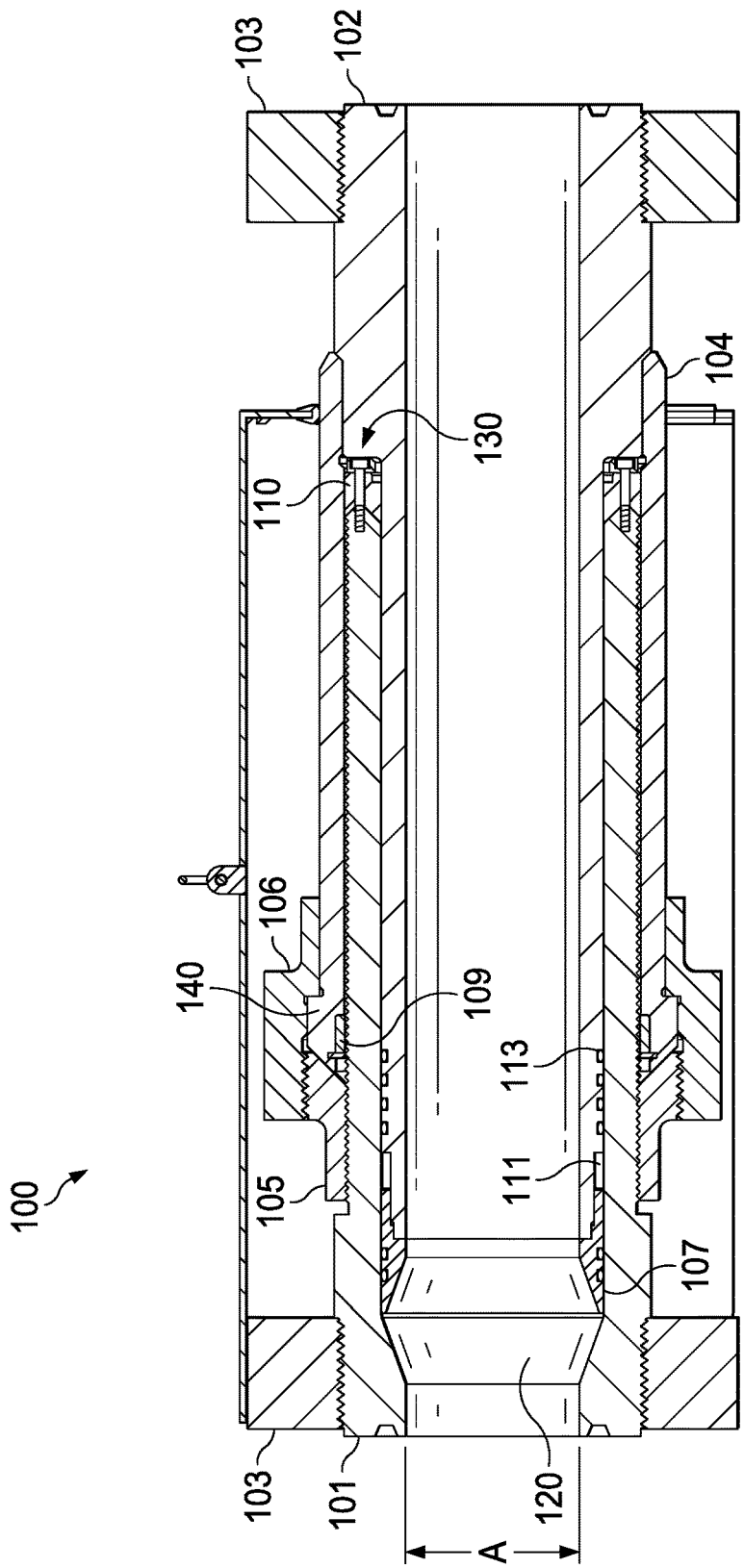
FIG. 1 is a side view of an embodiment of an extendable spool in its fully contracted position.
Figure 2:
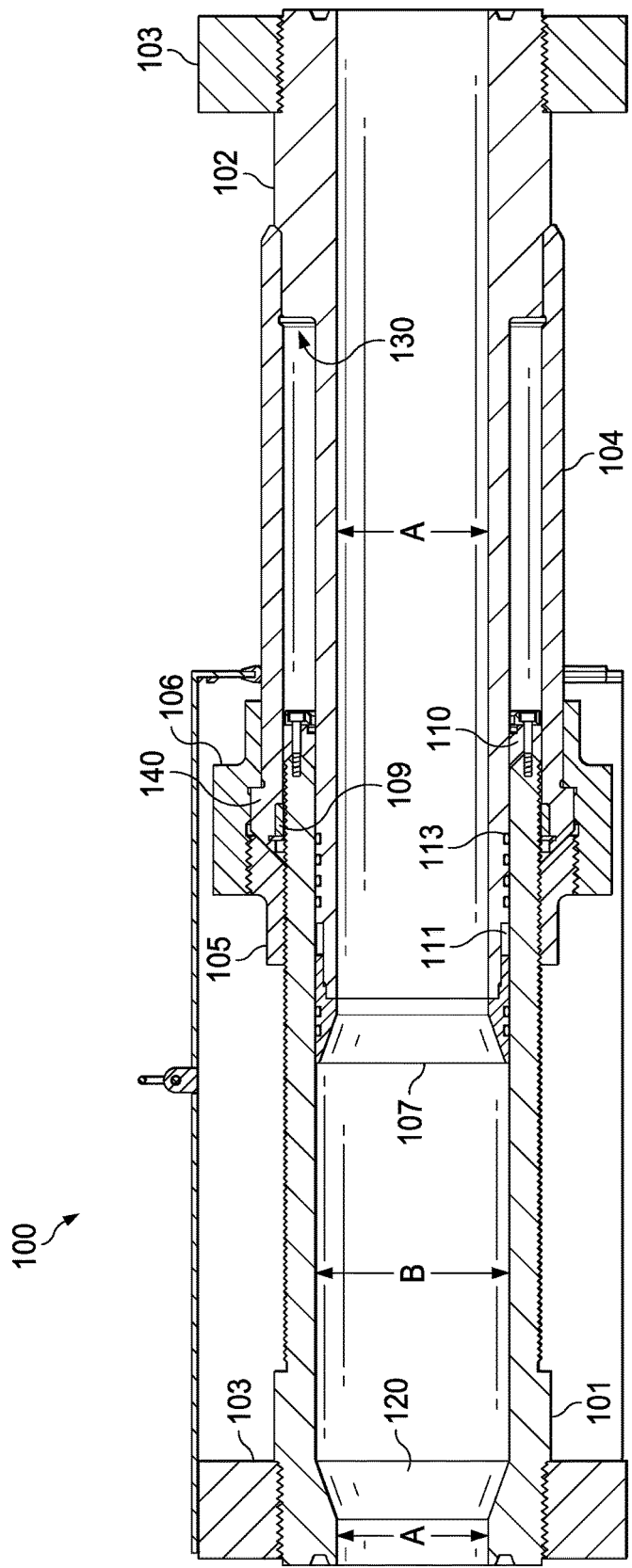
FIG. 2 is a side view of the embodiment of FIG. 1 in its fully extended position.
Figure 3:
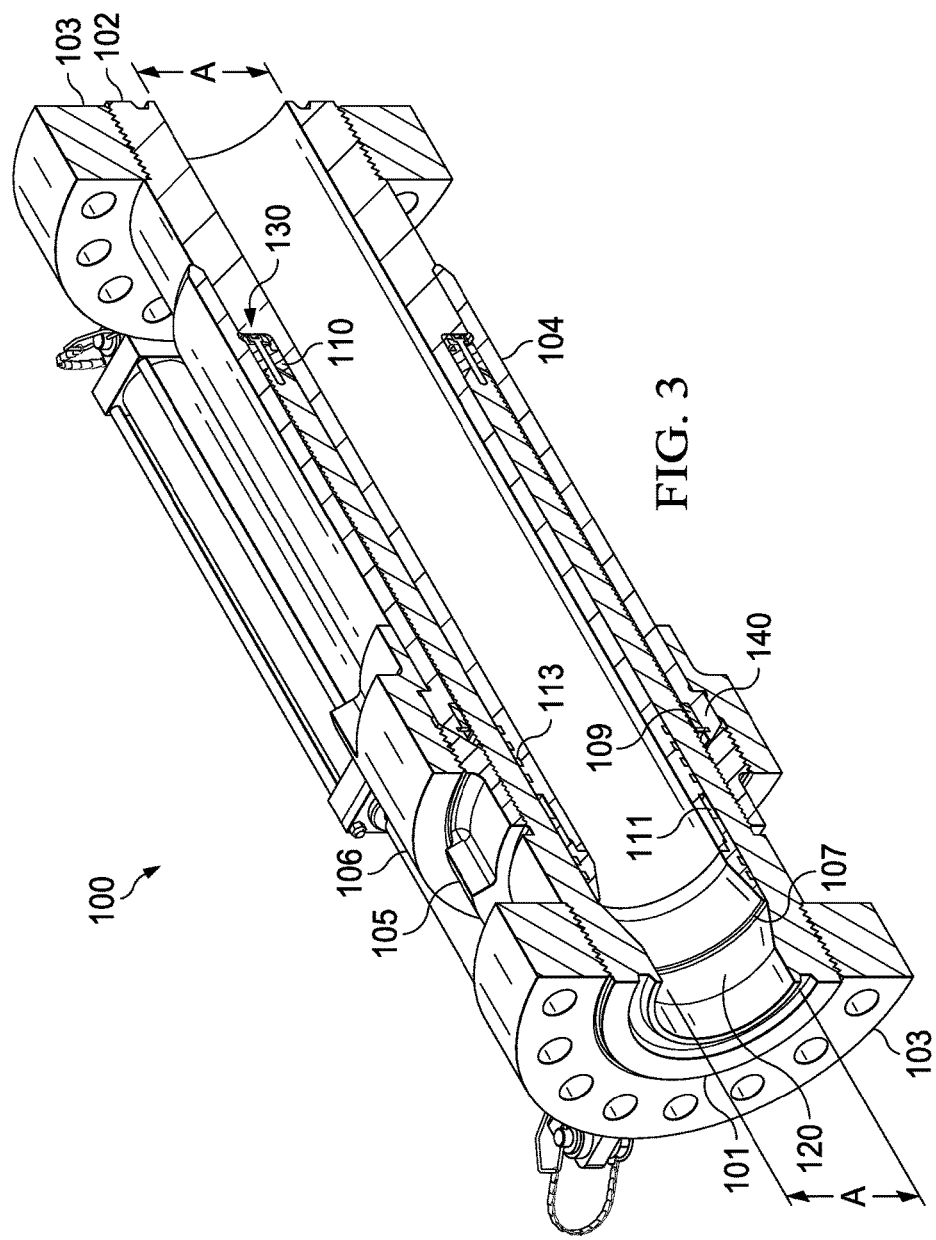
FIG. 3 is an isometric cutaway view of the embodiment of FIG. 1 in its fully contracted position.
Figure 4:
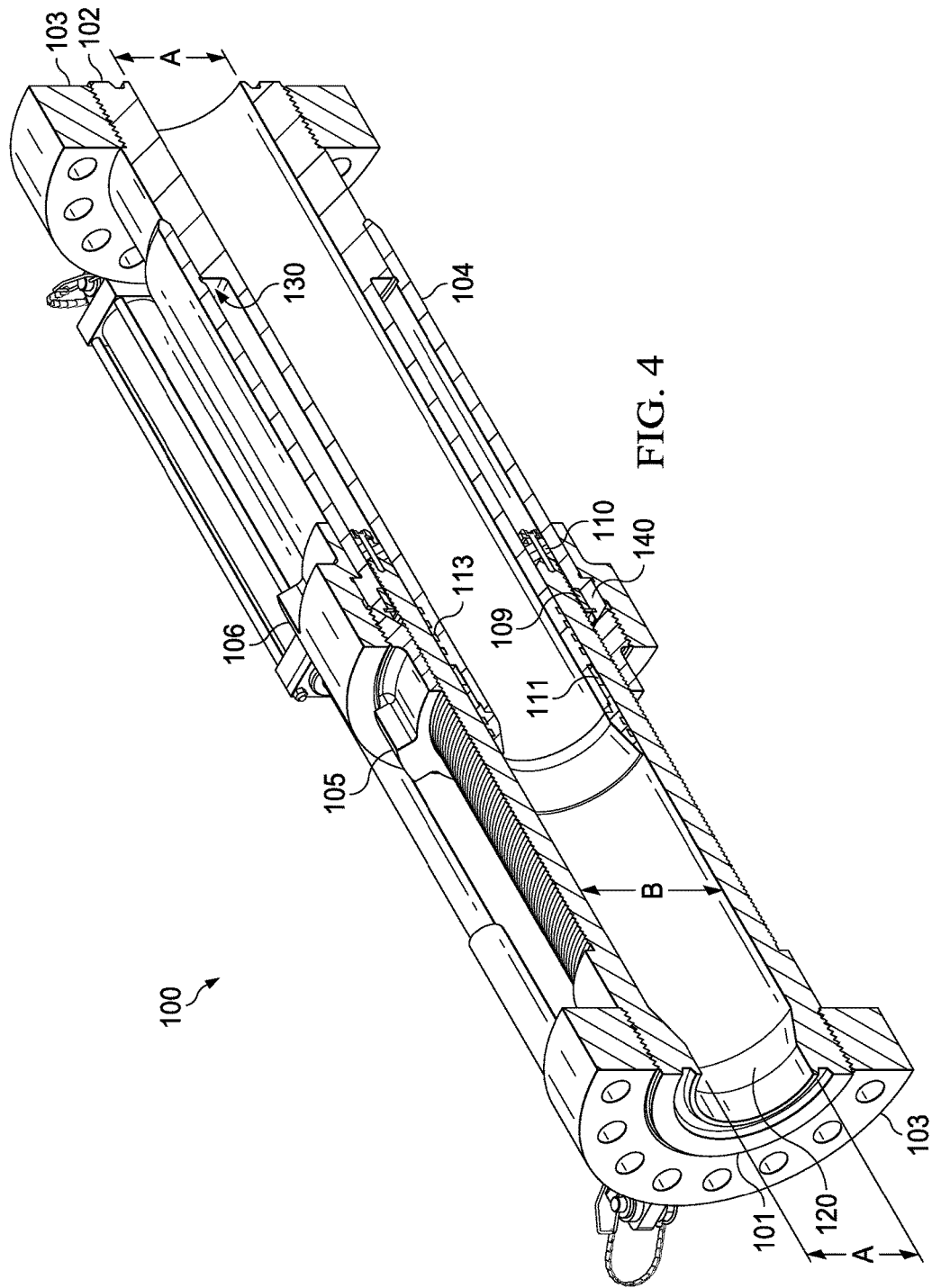
FIG. 4 is an isometric cutaway view of the embodiment of FIG. 1 in its fully extended position.

In an exemplary embodiment, FIGS. 1 and 2 schematically illustrate an extendable spool 100. The extendable spool 100 is a flow spool with a variable length. FIG. 1 illustrates the extendable spool 100 in fully contracted or compressed configuration, and FIG. 2 illustrates it in its fully extended configuration. The length is able to be varied continuously, rather than discretely, between the fully contracted and fully extended configurations. FIGS. 3 and 4 show isometric cutaway views of an embodiment of an extendable spool in fully contracted and fully extended positions.

The structure for two tubular sections of the extendable spool 100 through which fluid flows are described first. These sections are the threaded tube 101 and the inner tube 102. Each tubular section is designed to withstand pressurized fluids that may be used in hydraulic fracturing or other high-pressure downhole operations. The threaded tube 101 may have an inner diameter, referenced in FIG. 1 as 'A,' that is equivalent to the inner diameter of other tubular equipment to which the extendable spool may be connected. The threaded tube 101 may comprise an inner beveled shoulder 120 at which point the inner diameter of the threaded tube 101 increases from 'A' to a larger diameter 'B.' This increased diameter 'B' of the threaded tube 101 allows it to accommodate the outer diameter of inner tube 102. The inner surface of the threaded tube 101 and the outer surface of inner tube 102 are both smooth, such that the inner tube 102 is able to freely move axially within the increased inner diameter of the threaded tube 101. If inner tube 102 has an inner diameter of 'A,' then increased inner diameter 'B' of the threaded tube 101 will be substantially similar to diameter 'A' plus twice the wall thickness of inner tube 102.

The inner beveled shoulder 120 of the threaded tube 101 may act as a physical stop to the inward axial movement of inner tube 102 when inner tube 102 is axially moved relative to threaded tube 101. The inner tube 102 comprises an outer shoulder 130 which similarly may act a physical stop to the inward axial movement of inner tube 102 relative to threaded tube 101. The inner end portion of inner tube 102 may include a beveled end cap called a wash cone 107 which may be threadably engaged with inner tube 102. In an embodiment, the wash cone 107 may be integral to inner tube 102. The wash cone 107 has an outer diameter that is equal to the outer diameter of the inner tube 102, and the inner diameter of the wash cone 107 varies radially along the bevel from the inner diameter of the inner tube 102 to the increased inner diameter of the threaded tube 101.

In the embodiment above, both the inner beveled shoulder 120 of the threaded tube 101 and the beveled surface of wash cone 107 are configured to gradually change their inner diameter from 'A' to 'B.' Accordingly, there are no abrupt interior edges along the flow path through the threaded tube 101 and the inner tube 102, even when the threaded tube 101 and inner tube 102 are configured to different axial lengths of the extendable spool 100.

The ends of the threaded tube 101 and the inner tube 102 may each threadably engage with a spool flange 103, which enables both ends of the extendable spool 100 to be connected to other tubular equipment. In an embodiment, the spool flanges may be integral to the threaded tube 101 and the inner tube 102.

Sealing between the threaded tube 101 and the inner tube 102 is accomplished via seals 113, such as o-rings, that sit in grooves on the outer surface of the inner tube 102. Similarly, the wash cone 107 may accommodate one or more seals 113 in grooves on its outer surface. The seals 113 mate with a corrosion resistant sealing surface on the inner surface of the threaded tube 101. Bronze pieces 109, 110, and 111 may be used to facilitate sliding between the different steel parts.

The structure for setting and fixing the length of the extendable spool 100 is now described. As noted above, the threaded tube 101 and the inner tube 102 are movable relative to each other. They may be fixed relative to each other using other components, including tensile tube 104, inner wing 105, and outer wing 106. Referring still to FIGS. 1 and 2, the threaded tube 101 includes a threaded outer surface with which the inner wing 105 is threadably engaged. The axial location of the inner wing 105 along the threaded outer surface of the threaded tube 101 serves to define the length of extendable spool 100 and the position of the tensile tube 104, as will be described further below.

Still referring to FIGS. 1 and 2, the tensile tube 104 may be threadably engaged with inner tube 102 at or around the outer shoulder 130 of inner tube 102. Aside from the inner threaded connection that tensile tube 104 uses to connect to the outer shoulder 130 of inner tube 102, the inner surface of tensile tube 104 is smooth and not threaded. This allows the inner tube 102 and the tensile tube 104 together to freely move axially with respect to threaded tube 101 even though the outer surface of threaded tube 101 is threaded. The inner tube 102 and the tensile tube 104 are axially positioned such that the tensile tube 104 abuts the inner wing 105. As shown in FIGS. 1 and 2, the inner wing 105 and the tensile tube 104 abut at beveled ends, which allows the inner wing 105 to have a longer thread on its outer surface. In another embodiment, the inner wing 105 and the tensile tube 104 abut at straight ends.

Tensile tube 104 is fixed in place by outer wing 106, which threadably engages with the threaded outer surface of inner wing 105, and which locks the position of tensile tube 104 by engaging with a mating shoulder 140 of tensile tube 104.

Figure 5:
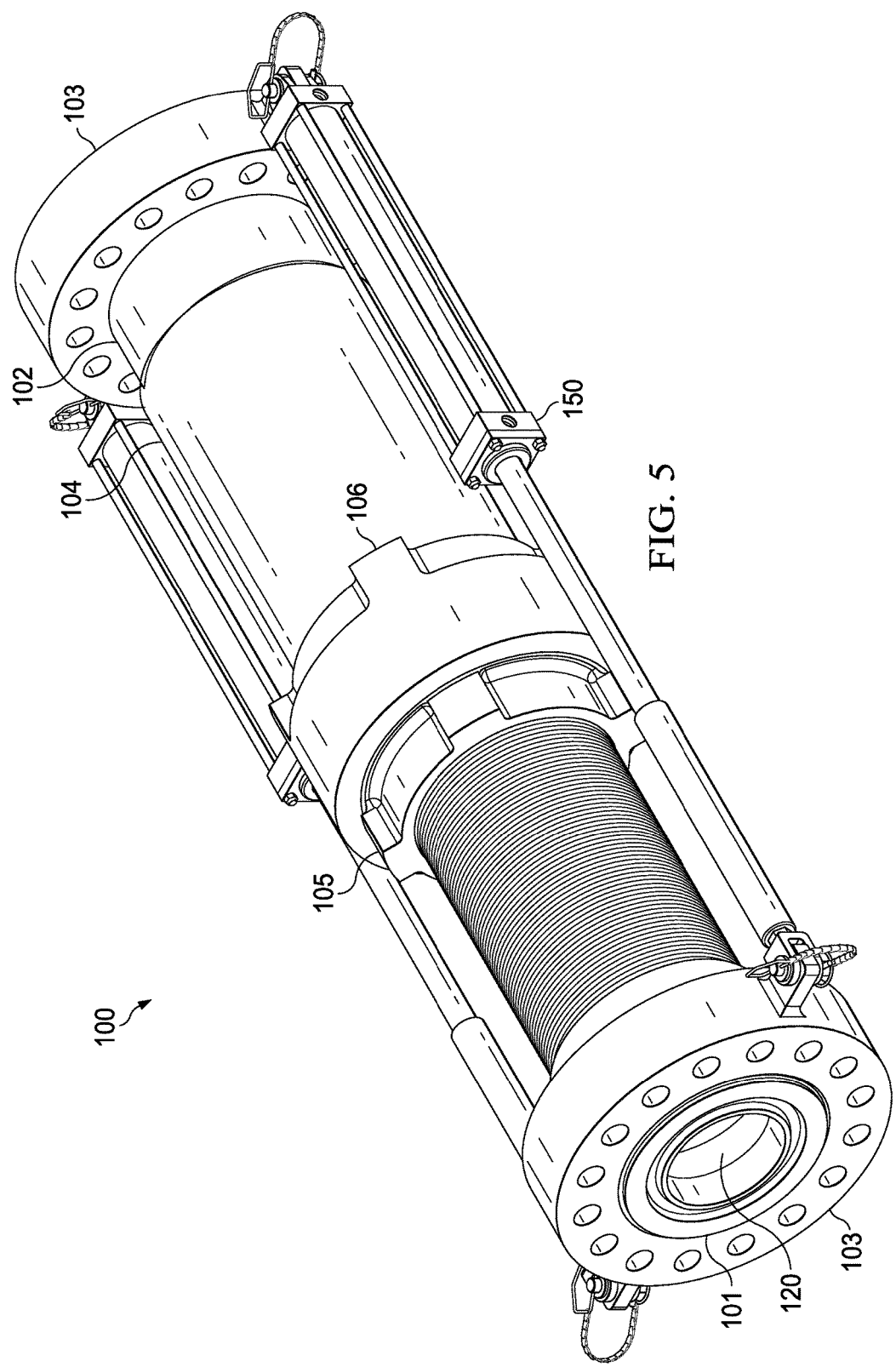
FIG. 5 is an isometric view of the embodiment of FIG. 1 in its fully extended position.

To change the length of the extendable spool 100, the inner wing 105 and outer wing 106 are unscrewed from each other, which allows outer wing 106 and tensile tube 104 to axially move relative to each other, and also allows tensile tube 104 and inner tube 102 to move relative to threaded tube 101. To extend the length of the spool 100, hydraulic cylinders (shown as element 150 in FIG. 5) can be used to stroke the extendable spool 100 to a desired length by longitudinally moving the tensile tube 104 and the inner tube 102 relative to threaded tube 101. Once the desired length is reached, the inner wing 105 is screwed to the desired position, or until inner wing 105 abuts tensile tube 104. In order to minimize the number of turns required to move inner wing 105 into the desired position, the outer surface of threaded tube 101 may be configured with multiple-start threads. Once inner wing 105 is in the desired position, outer wing 106 is screwed back on to inner wing 105 to lock the position of tensile tube 104.

If the operator desires to bring the ends of the spool closer together, the outer wing 106 is unscrewed from the inner wing 105, and the inner wing 105 must be backed away from the tensile tube 104 until inner wing 105 reaches the desired position. Then, hydraulic cylinders can retract the two ends together until the tensile tube 104 makes contact with the inner wing 105 again. The inner and outer wings 105 and 106 are then screwed back together to lock the spool 100 at the desired length.

It should be noted that, although tensile tube 104 and inner tube 102 are shown as threadably engaged, they may also be connected using pins, bolts, or any other known method of connecting tubular members. The only requirement of the tensile tube is that it remain connected to inner tube 102 in order to transfer longitudinal force from one end of the spool to the other and to facilitate adjustment of the length of the extendable spool as described above. As a result, tensile tube 104 and inner tube 102 could be formed as a single piece without departing from the scope of the present disclosure.

The threads on the outer surface of threaded tube 101 may be left-hand, or reverse, threads, such that relative counter-clockwise rotation will cause engagement of threaded tube 101 and the inner threads of inner wing 105. The threads that connect the wings (the outer threads of the inner wing 105 and the inner threads of outer wing 106) may be right-hand threads, such that relative clockwise rotation will cause engagement of the outer threads of inner wing 105 and inner threads of outer wing 106. The combination of right-hand threads at the inner-to-outer wing connection and left-hand threads at the inner-wing-to-threaded tube connection ensures that tightening the wings tightens both ends of the spool together. To accomplish this optional objective, the particular orientation of the two threaded portions of the inner wing is not important; in other words, it is irrelevant which set of threads is right-handed and which set of threads is left-handed. What matters is that the orientation of the threads that connect the inner wing to the outer wing is the opposite of the orientation of the threads that connect the inner wing to the threaded tube. The inner wing 105 and outer wing 106 may have radially outwardly extending protrusions, or lugs, which facilitate screwing and unscrewing.

Figure 6:
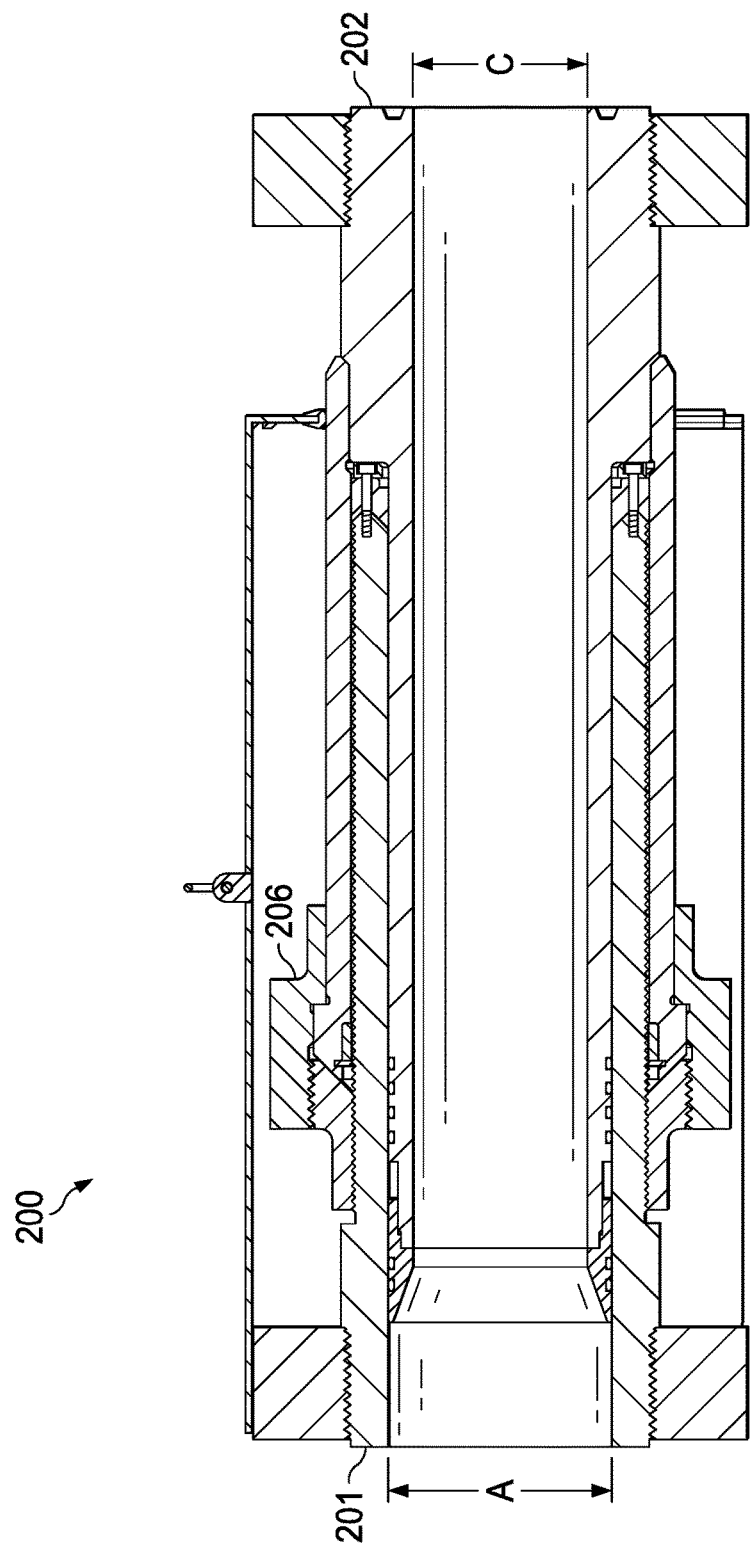
FIG. 6 is an alternative embodiment of an extendable spool.

FIG. 6 illustrates an alternate embodiment of an extendable spool 200. In this embodiment, the threaded tube 201 maintains a constant inner diameter 'A.' Inner tube 202 has an outer diameter that is substantially equal to 'A' and an inner diameter 'C' that is smaller. Other components and aspects of the extendable spool 200 are similar to those described above.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. An extendable tubular spool comprising:
    a threaded tube comprising a smooth inner surface and a threaded outer surface with threads having a first orientation;
    an inner tube, a portion of the exterior surface of the inner tube slidably engageable within the smooth inner surface the threaded tube;
    a tensile tube engaged with the inner tube, the tensile tube slidably engageable with the threaded outer surface of the threaded tube;
    an inner wing comprising inner threads having the first orientation and outer threads having a second orientation, the inner wing configured to threadably engage with the threaded outer surface of the threaded tube; and
    an outer wing comprising:
        a threaded inner surface with threads having the second orientation and configured to threadably engage with the outer threads of the inner wing; and
        a radially extending mating shoulder configured to engage with a corresponding shoulder on the outer surface of the tensile tube.

2. The extendable tubular spool of claim 1, wherein the first orientation is the opposite of the second orientation.

3. The extendable tubular spool of claim 2, wherein the first orientation comprises left-handed threads and the second orientation comprises right-handed threads.

4. The extendable tubular spool of claim 1, wherein the inner wing engages with the tensile tube at a beveled edge.

5. The extendable tubular spool of claim 1, wherein the inner tube further comprises a first flange, and wherein the threaded tube comprises a second flange.

6. The extendable tubular spool of claim 1, wherein the inner tube is configured to threadably engage a first flange and the threaded tube is configured to threadably engage a second flange.

7. The extendable tubular spool of claim 1, wherein the inner tube comprises an outer diameter that is substantially similar to an inner diameter of the threaded tube.

8. The extendable tubular spool of claim 1, wherein the inner tube further comprises a wash cone.

9. A method of adjusting the length of an extendable spool, the method comprising:
    unscrewing an outer wing from an inner wing to release a tensile tube from a threaded tube, the inner wing threadably engaged to the threaded tube, and the tensile tube engaged to an inner tube;
    moving the tensile tube and the inner tube to a different axial position along the length of threaded tube;
    positioning the inner wing along the threaded tube to abut the tensile tube; and
    screwing the outer wing to the inner wing to secure the tensile tube and the inner tube to the threaded tube.

10. The method of claim 9, wherein the step of moving the tensile tube and the inner tube to a different axial position is performed using a hydraulic cylinder.

* * * * *